Aug. 27, 1968          L. H. MORIN          3,398,775
SKEW WASHER LOCKNUT
Filed July 12, 1966
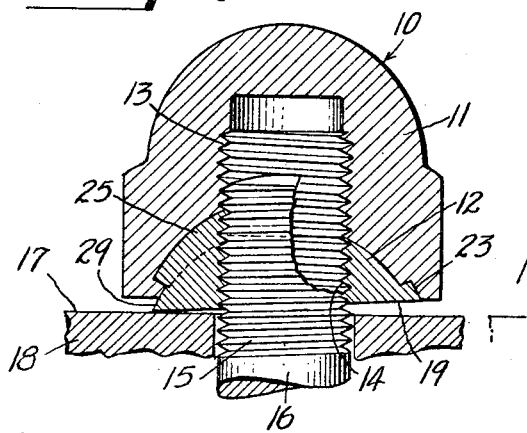
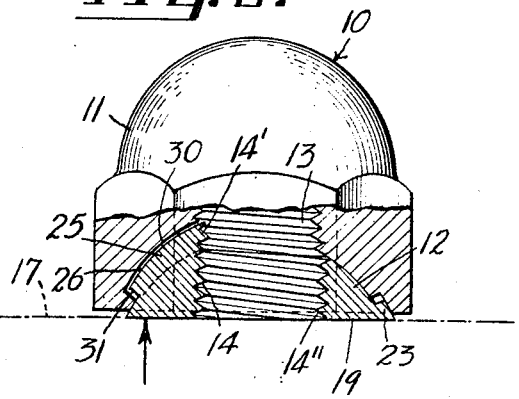
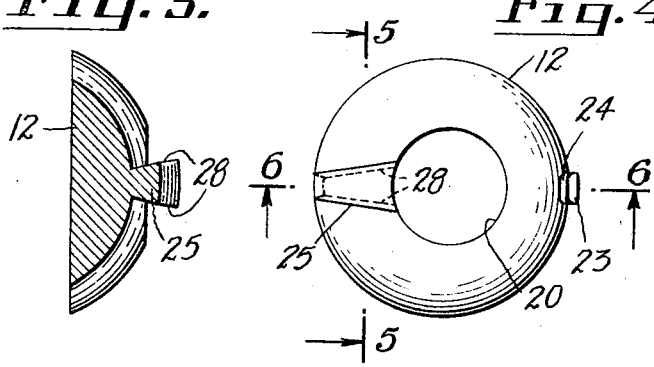
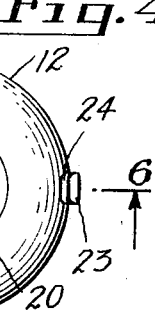
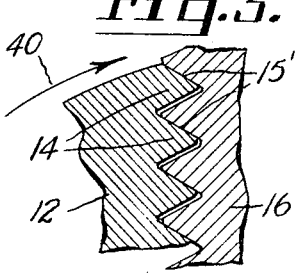
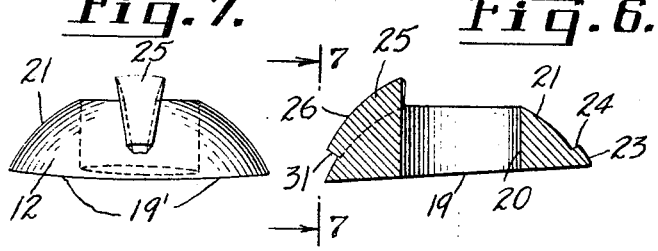
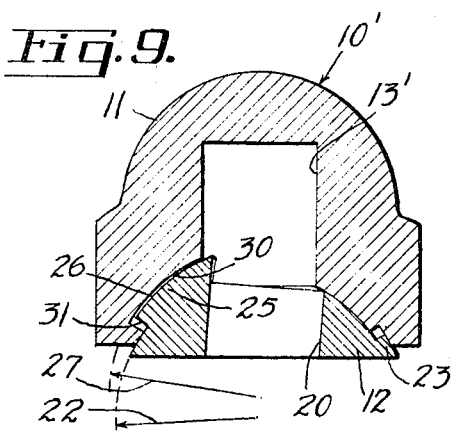
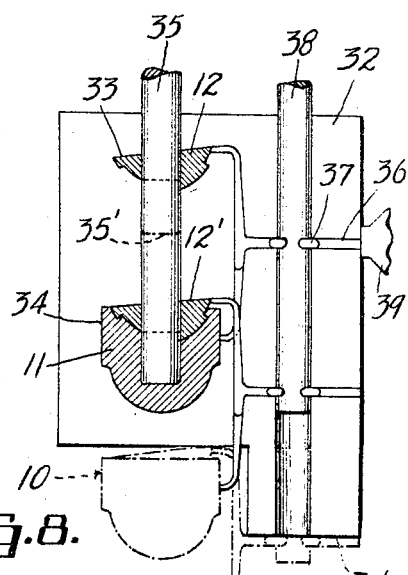
INVENTOR.
LOUIS H. MORIN
BY
Howard E. Thompson
ATTORNEY

United States Patent Office 3,398,775
Patented Aug. 27, 1968

3,398,775
SKEW WASHER LOCKNUT
Louis H. Morin, Bronx, N.Y., assignor to Coats & Clark Inc., New York, N.Y., a corporation of Delaware
Filed July 12, 1966, Ser. No. 564,653
6 Claims. (Cl. 151—15)

ABSTRACT OF THE DISCLOSURE

A two-piece locknut assemblage wherein a "skew" washer portion thereof is designed to jam against the threads of a bolt or other screw threaded element to which the nut is attached when the nut is screwed against a flat surface.

---

This invention relates to a locknut assemblage comprising a nut and a "skewed" washer axially assembled but providing for relative movement between the two members so that when the nut is screwed down into place on a bolt against a flat surface, the washer will be displaced sufficiently to jam against the threads of the bolt and hold the nut in place.

This invention relates to what are generally referred to as locknuts, wherein the locknut assemblage comprises a nut or other threaded member cast or molded upon a preformed cast or molded skew washer in formation of the assemblage, so as to maintain the two parts of the assemblage in coupled relationship, while permitting the skew washer to swing in the threaded member in movement of threads of the washer into pressure engagement with threads of a bolt or the like. More particularly, the invention deals in a method of producing a skew washer locknut assemblage of the type and kind defined.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a sectional view through a locknut assemblage made according to my invention, illustrating its arrangement upon the threads of a bolt, preparatory to moving the assemblage into a locking position on the bolt in securing two or more parts together.

FIG. 2 is a diagrammatic and exaggerated view to illustrate swinging movement of the skew washer in the threaded member, omitting the bolt and its threads for sake of clarity.

FIG. 3 is an enlarged detail sectional view illustrating the engagement of the upper portion of the skew washer with the threads of a bolt or other member.

FIG. 4 is a plan view of the skew washer, as seen in FIG. 6.

FIG. 5 is a section substantially on the line 5—5 of FIG. 4.

FIG. 6 is a section substantially on the line 6—6 of FIG. 4.

FIG. 7 is a view looking generally in the direction of the line 7—7 of FIG. 6.

FIG. 8 is a diagrammatic view illustrating the method of producing the lock nut assemblage; and FIG. 9 is a sectional view through what might be termed the blanks of the washer and nut body, preparatory to formation of the threads in both parts and illustrated primarily to show the different radiuses on surfaces of the washer and the angular or locking position of the washer, similar to that diagrammatically illustrated in FIG. 2.

Considering FIG. 1 of the drawing, the locknut assemblage is generally identified by the reference character 10. This assemblage comprises, in the construction shown, a nut member 11 and a skew washer 12. The member 11 has a threaded bore 13 and the washer 12 has a threaded bore 14, which is normally in alinement with the threaded bore 13, as the threads of both parts are simultaneously formed in one threading operation, as later described. This structure permits normally a free rotation of the assemblage on the threads 15 of a bolt or other threaded coupling 16 in movement of the washer 12 into engagement with the surface 17 of one part 18 of two or more parts to be coupled, as will be apparent.

In FIG. 2, the assemblage is shown in what can be referred to as an exaggerated showing primarily to illustrate movement of the skew washer 12 in the member 11 in establishing the gripping or locking engagement with the threads of a bolt or the like. In this figure, the surface 17 is illustrated in dot-dash lines.

In accordance with the method later described, the member 11 is molded or cast upon the premolded or precast skew washer 12, resulting in the assemblage, as seen in FIG. 1. The washer 12 has an angular lower surface 19 curved laterally, as seen in FIG. 7 at 19'.

When cast, the washer 11 has a plain bore 20, note FIGS. 4, 6, 8 and 9. The upper surface of the washer 11 is rounded, as seen at 21, FIGS. 6 and 7. This rounded surface is formed on a radius indicated by the line 22 of FIG. 9. At one side of the washer 11, the surface 21 has a raised outwardly projecting lug 23 forming a shoulder 24, note FIGS. 4 and 6. Opposed to the lug 23, the washer 11 includes a raised keystone-shaped key 25, the outer surface 26 of which is formed on a radius 27, note FIG. 9.

Considering FIGS. 4 and 7 of the drawing, it will appear that the key 25 is narrow at the bottom and wide at the top. The sides of the key 25 are bevelled inwardly, as seen at 28 in FIG. 5. This formation of the key 25 provides a dovetailed coupling of the washer 12 with the member 11 to prevent separation of the parts, as well as permitting swinging movement of the washer from the position shown in FIG. 1 to a position generally similar to the exaggerated showing in FIG. 2. In this swinging movement, the upper portion of the threads 14, as at 14', FIG. 2, will bind on the threads 15 of a bolt or the like 16, assuming that 16 was in operative position in FIG. 2. At the same time, the lower portion of the threads 14 at 14", FIG. 2, will be in close engagement with and bear to a slight degree upon the threads 15 of the bolt 16.

In molding the member 11 on the washer 12, the member 11 conforms to the contour of the upper surfaces of the washer 12. However, the angular formation of the lower surface 19 of the washer 12 will leave a projection on the washer 12, as clearly seen at 29 in FIG. 1 of the drawing.

Considering FIGS. 2 and 9 of the drawing, it will appear that, when the skew washer 12 moves into its locking position, the outer surface 26 of the key 25 moves into spaced relation to the surface 30 of the member 11, the surface 30 being initially formed in molding 11 upon the washer 12, as will appear from a consideration of FIG. 1.

The lower end 31 of the key 25, note FIG. 9, forms a stop, checking movement and displacement of the washer 12 from the member 11, as will be apparent from a consideration of FIG. 1.

Turning now to the diagrammatic showing of FIG. 8, 32 represents a surface of one die of a pair of dies employed to form the assemblage. At 33 is shown the cavity for forming the skew washer 12, at 34 the cavity to form the nut or other member 11. In forming the assemblage, the washer 12 and member 11 are formed on a movable core pin 35, which pin forms the bore 20 of the washer 12, as well as a bore 13' in the member 11, which bore is later threaded, as seen at 13 in FIG. 1.

At 36 is shown a sprue or gate leading to the respective cavities 33 and 34, this sprue or gate including a partial ring portion 37 formed around a transfer pin 38 and at 39 is indicated, in part, an injection nozzle for injecting the material into the cavities 33 and 34 through the branches of the sprue, as diagrammatically shown.

Considering the molding or casting process to be in operation, in each injection of the molding or casting material, a washer 12 and a member 11 will be formed on the core 35 in the position of the core shown in FIG. 8. Upon completing this operation, the core 35 is moved into a raised position, with the dies closed, as indicated by the dot-dash line 35', after which, the dies are separated and, then, the transfer pin 38 moves the parts into the position shown, in part, in dot-dash lines in FIG. 8, with the complete assemblage positioned at a trimming station, where the sprues or gates can be trimmed or removed from the assemblage; the dies are again closed and the pin 38 is stripped from the trimmed sprue 36, as at 36' while the pin 38 is moved to the raised full line position of FIG. 8; whereupon, with the dies open, the core 35 then moves downwardly, to bring the upper skew washer 12 into position in the cavity 34; whereupon, the dies are closed upon the assemblage, with the core 35 shown in the full line position shown in FIG. 8; whereupon, the next successive charge of material into the cavities takes place, forming another skew washer 12 and a member 11 on the skew washer, as at 12', then positioned in the cavity 34. This operation is repeated in producing in each cycle of operation successive assemblages, such as shown at 10' in FIG. 9 of the drawing, with the bores 20, 13' in common alinement, as will be clear from a consideration of FIG. 8. In FIG. 9, the skew washer 12 is shown diagrammatically in a position similar to FIG. 2 in order to show the spacing at 26.

The next step in the method consists in suitably supporting the assemblage 10' in a jig or fixture in performing the threading operation of the bores 20, 13', with these bores in a common alinement, thus producing the threads 13 in the bore 13' and the threads 14 in the bore 20. The resulting assemblage 10 is then produced, preparatory for use and this assemblage can be freely spun on the threads 15 of the bolt 16, until the washer 12 comes into contact with the surface 17.

The illustration in FIG. 3 is shown primarily to note by the arrow 20 the swinging movement of the skew washer 12 with respect to the threaded coupling, such as the bolt 16 in illustrating the pressure engagement of the threads 14 of the washer with the threads 15 of the bolt 16, as seen at 15'.

In the diagrammatic showing in the accompanying drawing, the member 11 has been illustrated as a cap nut. It will be apparent, however, that this threaded member can be an ordinary hex nut, winged nut or other threaded member, as more fully disclosed in a companion application filed of equal date herewith.

For purposes of description, the movement of the skew washer into operative position, as shown in FIGS. 2 and 9, disposes the axis of the threaded bore of the washer in angular position with respect to the axis of the threaded bore of said nut-like member. The degree of this angular movement will govern the locking engagement of the assemblage on the bolt or other threaded member.

Having fully described my invention, what I claim as new and desire to secure by Letters Patent is:

1. A locknut assemblage comprising a nut-like member including a threaded bore, a skew washer having a threaded bore, means on the member operatively engaging said member in keying the washer against axial displacement from said member, said washer having spherical surface cooperating with a corresponding surface in a recess at the bearing end of said member providing said washer with a swinging movement in said member to dispose the axis of the threaded bore of the washer angularly to the axis of the threaded bore of said member in producing a locking engagement of the assemblage with a threaded coupling engaged by the threads in the bore of said member and the threads in the bore of said washer, and the lower surface of said washer projecting axially beyond the bearing surface of said member, said lower surface of said washer being uniformly curved throughout the lateral extent thereof at an angle to the bearing surface of said member to contribute the swinging movement to the washer in moving the member of the assemblage into locking position.

2. An assemblage as defined in claim 1, wherein said means comprises a dovetailed key projecting from an upper rounded surface of said washer.

3. An assemblage as defined in claim 2, wherein said key has an upper rounded surface of a radius contrasting to the radius of the upper rounded surface of the washer.

4. An assemblage as defined in claim 3, wherein the upper surface of the water, opposed to said key, includes an upwardly and outwardly projecting lug.

5. An assemblage as defined in claim 4, wherein said key terminates short of the lower surface of the washer to form a shoulder, preventing displacement of the washer from said member.

6. An assemblage as defined in claim 1, wherein pressure locking engagement of the threads of the washer with the threads of the coupling are located primarily in the area of the key means at the upper portion of one side of the washer, as well as an engagement with the coupling at the opposed lower side of the washer.

References Cited
UNITED STATES PATENTS

| | | | |
|---|---|---|---|
| 323,560 | 8/1885 | Burdick | 151—15 |
| 1,986,891 | 1/1935 | Green | 151—15 |
| 2,886,086 | 5/1959 | Morton | 151—15 |

CARL W. TOMLIN, *Primary Examiner.*

R. S. BRITTS, *Assistant Examiner.*